I. Holmes,
Inhalers.
No. 61,008. Patented Jan. 8, 1867.
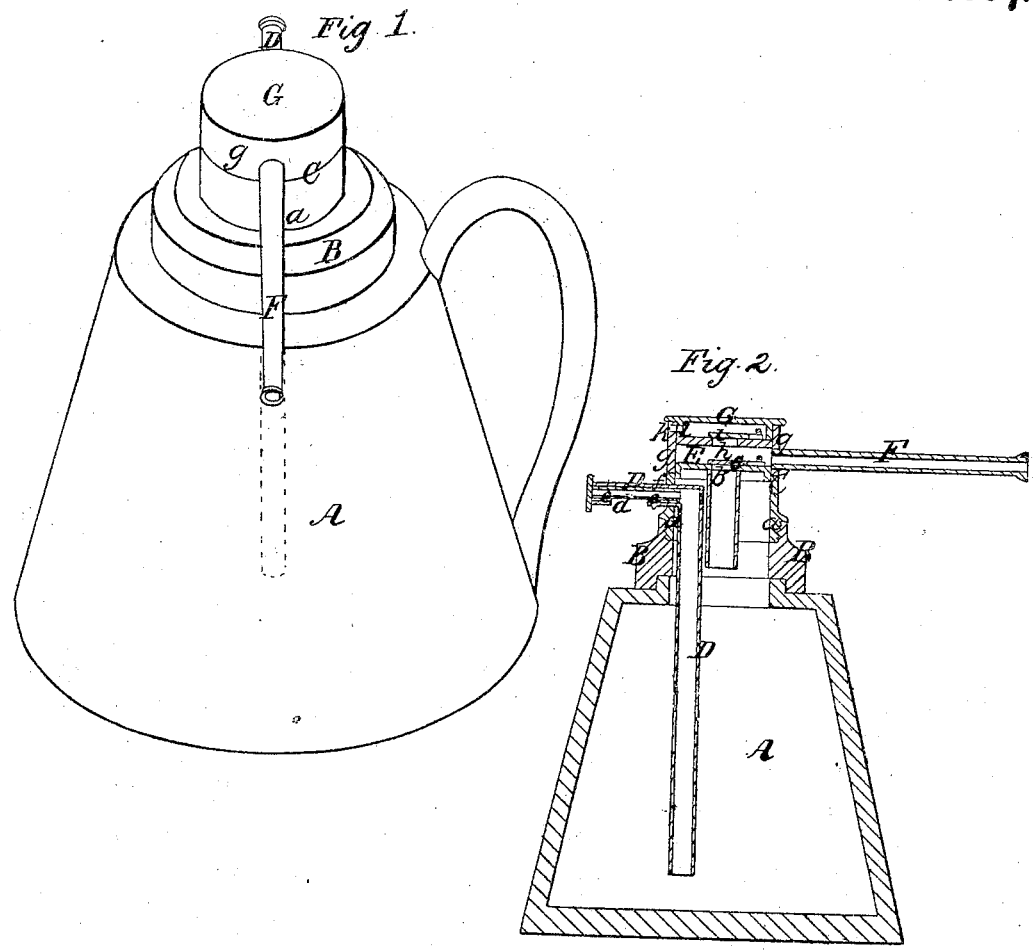
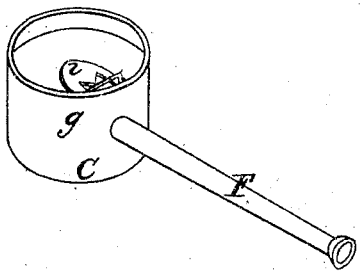
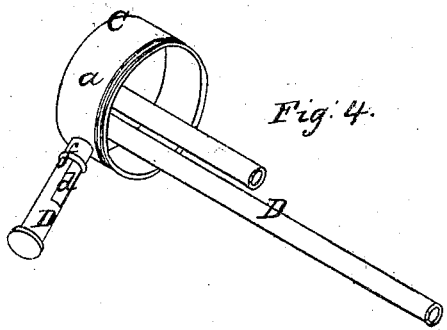
Witnesses:
J. B. Goslersh
N. W. Stearns
Inventor.
Ira Holmes

United States Patent Office.

IRA HOLMES, OF MOSCOW, NEW YORK.

Letters Patent No. 61,008, dated January 8, 1867.

---

IMPROVEMENT IN INHALERS.

---

The Schedule referred to in these Letters Patent and making part of the same.

---

TO ALL WHOM IT MAY CONCERN:

Be it known that I, IRA HOLMES, of Moscow, in the county of Livingston, and State of New York, have invented certain improvements in Inhalers, of which the following is a full, clear, and exact description, reference being had to the accompanying drawings, making part of this specification, in which—

Figure 1 is a perspective view of my improved inhaler.

Figure 2 is a vertical section through the centre of the same.

Figures 3 and 4, details to be referred to.

The object of my invention is to produce an inhaler for dental or medical purposes, of simple construction, in which the gas or vapor, after being inhaled through a tube into the mouth, is exhaled without removing the tube therefrom, and without returning into the receptacle from which it has been drawn, and my invention consists in a cap provided with a chamber, commanded by valves, which are opened and closed by the inspiration and respiration of the operator, through a tube or mouth-piece; the cap, with its valves and tube being attached to any suitable receptacle containing the gas or vapor to be inhaled, the receptacle or cap being also provided, if desired, with a passage, by which air or gas may be allowed to mix with the contents of the receptacle.

To enable others skilled in the art to understand and use my invention, I will proceed to describe the manner in which I have carried it out.

In the said drawings, A is the receptacle for containing the substance from which is generated the vapor or gas to be inhaled. This receptacle is provided with a metallic top, B, which is furnished with a screw-thread for the reception of a corresponding screw-thread, cut on the lower end, a, of a circular cap or casing, C, in the centre of the top of which is formed a hole, b, which is commanded by a valve, c. D is a bent tube, (see figs. 2 and 4,) which passes through the side of the lower portion, a, of the casing C, and extends down through the substance (the vapor from which is to be inhaled) to near the bottom of the receptacle A. The portion of the tube D extending from the side of the lower portion, a, of the cap is provided with a longitudinal opening, d, which is commanded by a valve, e, in order to admit or exclude the atmospheric air for the purpose of mixing it with the contents of the receptacle A, when desired. f is a flange, over which the mouth of a bag containing gas may be fitted. The upper portion, g, of this cap or casing is made removable, and when in place fits snugly over the lower portion, a, so as to form a chamber, E, into which opens the inner end of a tube or mouth-piece, F. h is a circular opening made through the top of the upper portion, g, of the cap, and is commanded by a valve, i. The upper side of the portion, g, is perforated with holes, k, one or more of which may be opened by bringing into line therewith corresponding holes, l, formed in a cover, G, the purpose of the holes and cover being to oblige the operator to retain the inhaled gas or vapor and keep the lungs inflated for a longer period than would be the case without them.

*Operation.*

The liquid or other substance, the vapor from which is to be inhaled, being placed within the receptacle, the operator applies his mouth to the tube F, when he draws in his breath, which exhausts the air from the chamber E, and the valve e is raised, thus allowing the gas or vapor which is generated within the receptacle to be inhaled; when, after having remained within the lungs a sufficient time, it is expelled by blowing it through the same tube, the valve i being raised by the forced current of air which is driven out through the holes k l away from the face of the inhaler, the valve c during this operation closing, by the pressure of the air and its weight, the opening b, and thereby preventing the exhaled air from passing into the receptacle.

What I claim as my invention, and desire to secure by Letters Patent, is—

The cap C, with its chamber E, valves c i, and tubes D F, when arranged in the manner and for the purpose set forth.

IRA HOLMES.

Witnesses:
P. E. TESCHEMACHER,
N. W. STEARNS.